United States Patent
Toffey et al.

(10) Patent No.: US 10,049,405 B2
(45) Date of Patent: Aug. 14, 2018

(54) SYSTEM AND METHOD FOR SPECIFIED POOL TRADING

(71) Applicant: Tradeweb Markets LLC, Jersey City, NJ (US)

(72) Inventors: James W. Toffey, Summit, NJ (US); Jonathon Williams, Huntington, NY (US)

(73) Assignee: Tradeweb Markets LLC, New York, NY (US)

( * ) Notice: Subject to any disclaimer, the term of this patent is extended or adjusted under 35 U.S.C. 154(b) by 0 days.

(21) Appl. No.: 13/964,526

(22) Filed: Aug. 12, 2013

(65) Prior Publication Data

US 2013/0332331 A1 Dec. 12, 2013

Related U.S. Application Data

(63) Continuation of application No. 12/401,084, filed on Mar. 10, 2009, now abandoned.
(Continued)

(51) Int. Cl.
*G06Q 40/00* (2012.01)
*G06Q 40/04* (2012.01)
(Continued)

(52) U.S. Cl.
CPC ............ *G06Q 40/04* (2013.01); *G06Q 40/00* (2013.01); *G06Q 40/06* (2013.01); *G06Q 50/188* (2013.01)

(58) Field of Classification Search
CPC ........ G06Q 40/04; G06Q 40/00; G06Q 40/06; G06Q 50/188
See application file for complete search history.

(56) References Cited

U.S. PATENT DOCUMENTS

| 4,674,044 A | 6/1987 | Kalmus et al. |
| 4,750,135 A | 6/1988 | Boilen |

(Continued)

FOREIGN PATENT DOCUMENTS

| EP | 0816979 A1 | 1/1998 | |
| WO | WO-03017051 A2 * | 2/2003 | ........... G06Q 40/025 |

OTHER PUBLICATIONS

"Payment Calculations for Mortgage-Backed Securities", Freddie Mac, Feb. 25, 2006. (Year: 2006).*

(Continued)

*Primary Examiner* — Edward J Baird
(74) *Attorney, Agent, or Firm* — Stroock & Stroock & Lavan LLP

(57) ABSTRACT

A computer system and related methods configured to store and deliver, upon request, information related to asset-backed security pools, and execute transactions between one or more parties relating to the same. The system generally comprises a computer and a network interface that includes a data storage system in communication with the computer, the data storage system storing information relating to the securities, and account information related to at least one or more parties. The computer operative to provide information related to security pools to at least one of the parties, enable the at least one party to select one or more security pools for inclusion in a specified pool, provide aggregate pool data and information related to the selected specified pool to at least one other party, receive pricing information from at least one other party, and execute a trade for the asset-backed security pools in the specified pool.

24 Claims, 12 Drawing Sheets

Related U.S. Application Data

(60) Provisional application No. 61/047,644, filed on Apr. 24, 2008, provisional application No. 61/035,295, filed on Mar. 10, 2008.

(51) Int. Cl.
  *G06Q 40/06* (2012.01)
  *G06Q 50/18* (2012.01)

(56) References Cited

U.S. PATENT DOCUMENTS

| | | | |
|---|---|---|---|
| 5,003,473 | A | 3/1991 | Richards |
| 5,077,665 | A | 12/1991 | Silverman et al. |
| 5,136,501 | A | 8/1992 | Silverman et al. |
| 5,168,446 | A | 12/1992 | Wiseman |
| 5,195,031 | A | 3/1993 | Ordish |
| 5,270,922 | A | 12/1993 | Higgins |
| 5,297,032 | A | 3/1994 | Trojan et al. |
| 5,497,317 | A | 3/1996 | Hawkins et al. |
| 5,502,637 | A | 3/1996 | Beaulieu et al. |
| 5,727,165 | A | 6/1998 | Ordish et al. |
| 5,774,880 | A | 6/1998 | Ginsberg |
| 5,826,243 | A | 10/1998 | Musmanno et al. |
| 5,857,176 | A | 1/1999 | Ginsberg |
| 5,905,974 | A | 5/1999 | Fraser et al. |
| 5,924,082 | A | 7/1999 | Silverman et al. |
| 5,924,083 | A | 7/1999 | Silverman et al. |
| 5,927,031 | A | 7/1999 | Martin |
| 5,940,809 | A | 8/1999 | Musmanno et al. |
| 5,946,667 | A | 8/1999 | Tull, Jr. et al. |
| 5,987,432 | A | 11/1999 | Zusman et al. |
| 6,006,206 | A | 12/1999 | Smith et al. |
| 6,016,482 | A | 1/2000 | Molinari et al. |
| 6,026,381 | A | 2/2000 | Barton, III et al. |
| 6,092,056 | A | 7/2000 | Tull, Jr. et al. |
| 6,105,005 | A | 8/2000 | Fuhrer |
| 6,161,099 | A | 12/2000 | Harrington et al. |
| 6,173,270 | B1 | 1/2001 | Cristofich et al. |
| 6,233,566 | B1 | 5/2001 | Levine et al. |
| 6,260,025 | B1 | 7/2001 | Silverman et al. |
| 6,269,346 | B1 | 7/2001 | Cristofich et al. |
| 6,317,727 | B1 | 11/2001 | May |
| 6,317,751 | B1 | 11/2001 | Yeger et al. |
| 6,347,307 | B1 | 2/2002 | Sandhu |
| 6,393,409 | B2 | 5/2002 | Young et al. |
| 6,421,653 | B1 | 7/2002 | May |
| 6,462,758 | B1 | 10/2002 | Price et al. |
| 6,505,175 | B1 | 1/2003 | Silverman et al. |
| 6,519,574 | B1 | 2/2003 | Wilton et al. |
| 6,560,580 | B1 | 5/2003 | Fraser et al. |
| 6,587,840 | B1 | 7/2003 | Smith et al. |
| 6,606,637 | B1 | 8/2003 | Hill et al. |
| 7,028,007 | B1 | 4/2006 | Abrahams et al. |
| 7,469,225 | B1* | 12/2008 | Perrucci .................. 705/35 |
| 7,499,883 | B2 | 3/2009 | Goldenberg et al. |
| 7,523,063 | B2 | 4/2009 | Harrington et al. |
| 7,526,443 | B2 | 4/2009 | Agarwal et al. |
| 7,539,641 | B2 | 5/2009 | Agarwal et al. |
| 7,555,455 | B2 | 6/2009 | Agarwal et al. |
| 7,590,585 | B2 | 9/2009 | Agarwal et al. |
| 7,822,677 | B1 | 10/2010 | Rodrigues et al. |
| 7,860,796 | B2 | 12/2010 | Levy |
| 7,904,381 | B1 | 3/2011 | Tatang et al. |
| 7,966,234 | B1* | 6/2011 | Merves .................. G06Q 40/00 705/35 |
| 8,165,955 | B2 | 4/2012 | Agarwal et al. |
| 8,185,465 | B2 | 5/2012 | Schiffman et al. |
| 8,195,558 | B2 | 6/2012 | Goldenberg et al. |
| 8,527,396 | B2 | 9/2013 | Agarwal et al. |
| 2001/0051908 | A1 | 12/2001 | Foster et al. |
| 2002/0002530 | A1 | 1/2002 | May |
| 2002/0004777 | A1 | 1/2002 | Foster et al. |
| 2002/0016761 | A1 | 2/2002 | Foster et al. |
| 2002/0026400 | A1 | 2/2002 | Naravan et al. |
| 2002/0046149 | A1 | 4/2002 | Otero et al. |
| 2002/0046151 | A1 | 4/2002 | Otero et al. |
| 2002/0046156 | A1 | 4/2002 | Horn et al. |
| 2002/0049661 | A1 | 4/2002 | Otrero et al. |
| 2002/0055901 | A1 | 5/2002 | Gianakouros et al. |
| 2002/0082967 | A1 | 6/2002 | Kaminsky et al. |
| 2002/0099651 | A1 | 7/2002 | May |
| 2002/0116317 | A1 | 8/2002 | May |
| 2002/0143694 | A1 | 10/2002 | Young et al. |
| 2002/0156719 | A1 | 10/2002 | Finebaum et al. |
| 2002/0161690 | A1 | 10/2002 | McCarthy et al. |
| 2002/0169704 | A1 | 11/2002 | Gilbert et al. |
| 2002/0184142 | A1 | 12/2002 | Whang |
| 2002/0198812 | A1 | 12/2002 | Wizon et al. |
| 2003/0018558 | A1 | 1/2003 | Heffner et al. |
| 2003/0046095 | A1 | 3/2003 | Jessop et al. |
| 2003/0055774 | A1 | 3/2003 | Ginsberg |
| 2003/0061069 | A1 | 3/2003 | Silverman et al. |
| 2003/0074306 | A1* | 4/2003 | Rios et al. .................. 705/38 |
| 2003/0083972 | A1* | 5/2003 | Williams .............. G06Q 40/04 705/36 R |
| 2003/0088509 | A1 | 5/2003 | Wilton et al. |
| 2003/0093360 | A1 | 5/2003 | May |
| 2003/0105696 | A1* | 6/2003 | Kalotay ............... G06Q 40/00 705/35 |
| 2003/0115131 | A1 | 6/2003 | Heaton et al. |
| 2003/0139997 | A1 | 7/2003 | Ginsburg |
| 2003/0149646 | A1 | 8/2003 | Chen et al. |
| 2004/0236668 | A1 | 11/2004 | Toffey |
| 2005/0038726 | A1* | 2/2005 | Salomon .............. G06Q 40/06 705/36 R |
| 2005/0097029 | A1 | 5/2005 | Cooper |
| 2005/0131787 | A1 | 6/2005 | Monteleone et al. |
| 2005/0203830 | A1 | 9/2005 | Prieston |
| 2005/0216394 | A1* | 9/2005 | Monteleone .......... G06Q 40/04 705/37 |
| 2006/0074793 | A1 | 4/2006 | Hibbert et al. |
| 2006/0161494 | A1 | 7/2006 | Littlewood |
| 2006/0184450 | A1* | 8/2006 | Ely ..................... G06Q 40/025 705/38 |
| 2007/0016520 | A1 | 1/2007 | Gang et al. |
| 2007/0078743 | A1* | 4/2007 | Shilpiekandula ...... G06Q 40/02 705/36 R |
| 2007/0118393 | A1* | 5/2007 | Rosen ................. G06Q 40/00 705/4 |
| 2008/0033889 | A1 | 2/2008 | Tappan et al. |
| 2008/0215474 | A1 | 9/2008 | Graham |
| 2008/0270290 | A1 | 10/2008 | Harrington et al. |
| 2008/0294544 | A1 | 11/2008 | Harrington et al. |
| 2010/0114743 | A1 | 5/2010 | Misraje et al. |

OTHER PUBLICATIONS

European Patent Application No. EP09719657 Communication Pursuant to Article 94(3) EPC dated Feb. 22, 2013.
Sidney L. Smith et al., Guidelines for Designing User Interface Software, the NITRE Corporation, Bedford, Massachusetts, Aug. 1986.
International Search Report and Written Opinion of the International Searching Authority dated Apr. 29, 2009 in International Application No. PCT/US09/36633.
International Search Report dated Jun. 19, 2006 in International Application No. PCT/US2005/10226.

* cited by examiner

REQ#. 1

Inventory Request

- 1202 — Size  75.0000 mm  MaxLoanBal  All  ← 1204
- 1206 — Issuer
- 1208 — Program
- 1210 — Coupon  to  5.5  lo  ALL
- 1212 — WAC  to
- 1214 — WAM  to
- 1216 — WALA  to
- 1218 — FICO  to
- 1220 — WLTV  55  to
- 1222 — States  All(0.0%),All(0.0%),All(0.0%)

| OID | State | Owner | Cusip | Size | Spread | Benchmark | Offer Time |
|---|---|---|---|---|---|---|---|

←1234

- 1230 — Pool#  ▽  Issuer  ▽  1234
- 1232 — Cusip  CPN  0.000  − +  WAM  − +  ← 1236
- 1238
- 1242 — Size(M)  1,000  − +  WAC  0.000  − +  WALA  0  − +  ← 1240
- 1244 — Spread  0-000  − +  MAXLOANBAL  − +  ← 1246
- 1248 — Benchmark  Factor  1.00000000  − +  ← 1250
- Note Add    Defer    Mine    Paste

SYSTEM AND METHOD FOR SPECIFIED POOL TRADING

CROSS-REFERENCE TO RELATED APPLICATIONS

This application is a continuation of U.S. patent application Ser. No. 12/401,084, filed on Mar. 10, 2009 which claims priority under 35 U.S.C. § 119(e) to Provisional Patent Application No. 61/035,295, filed Mar. 10, 2008, and Provisional Patent Application No. 61/047,644, filed Apr. 24, 2008, the entire disclosures of which are incorporated herein by reference.

BACKGROUND OF THE INVENTION

Field of the Invention

The embodiments of the present invention relate to a system and method for specified pool trading and, in particular, to a system and method for the creation, communication, price quotation, and execution of trades for specified pools of asset-backed securities.

Description of the Related Arts

Asset-backed securities are bonds that are backed by, or in other words "invested" in, a pool of assets, such as mortgages. Asset-backed securities use a pool of assets to diversify the security's holdings and reduce risk that the failure of any one asset in the pool will have a disproportional effect on the value of the whole.

The trading of asset-backed securities, such as mortgage-backed securities (MBS), has typically been performed on a to-be-announced (TBA) basis in which the buyer (also known as the "liquidity taker") and seller (also known as the "liquidity provider") agree on the general terms of the trade for a pool of assets. However, the specific assets that will be included in the security are not selected and are only revealed by the seller days after the trade, but in advance of the settlement of the trade. Thus, while the buyer can achieve a general investment objective through TBA trading, the buyer is unable to truly customize the security.

In the alternative, specified pool trading permits the buyer to select specific asset-backed securities to be included in the pool such that the details of the pool of assets is known to the buyer at the time of the trade. Thus, unlike TBA trading, the seller provides information to buyers about various asset-backed securities and the buyer makes its selections from the group of asset-backed securities provided by the seller. Due to the transparency, specified pool trading is generally higher cost than TBA trading.

In the recent market environment, buyers of asset-backed securities may begin to focus on the need to pick and choose the specific asset pools, namely specified pools, that may outperform or meet more particularized goals than generic TBAs. The ability to more accurately forecast the behavior of individual pools by better understanding the specific characteristics of the loans (and their respective borrowers in the case of MBS) can provide buyers with an additional ability to develop trading strategies virtually regardless of the market environment. This is one, among many, objectives of the present invention.

One of the technical problems with the current state of specified pool trading, particularly, in the mortgage-backed security markets, for example, is a lack of liquidity to adequately meet the needs of a growing focus on this type of financial instrument. This is because current systems and methods for trading specified pools of mortgage-backed securities are cumbersome and fail to provide an efficient and accessible platform for permitting liquidity providers (e.g., dealers; also known as market-makers) to offer various types of mortgage-backed securities, and for permitting liquidity takers (e.g., other dealers, investors and buy-side customers) to access a database of MBS, either specify criteria for stipulated pools or select one or more mortgage-backed securities to create a specified pool list, or select criteria for a to be created specified pool. Moreover, other systems fail to provide mechanisms permitting market participants to submit the selected pool(s) to one or more sellers, receive quotes from the sellers, and conduct trades for the specified pools. Additionally, current systems and methods fail to provide customers of asset-backed securities, such as MBS, the ability to specify criteria for a pool that is not currently listed in a seller's inventory, and submit that criteria to the seller for creation of a stipulated pool. The current methods for trading specified pools of asset-backed securities also fail to permit the straight-through-processing of specified pool trades. The lack of liquidity may ultimately lead to increased transaction costs and premiums over TBAs, and other inefficiencies. It, therefore, is another objective of the present invention, among others, to overcome some or all of the technical problems in the art.

SUMMARY OF THE EMBODIMENTS OF THE INVENTION

Embodiments of the present invention generally comprise a computer-implemented method for creating specified pools lists of asset-backed security pools, or alternatively creating characteristic sets for a customized specified pool to be created, and thereafter communicating, exchanging price quotations, and executing trades for specified pools of asset-backed securities using a system capable of communication with a buyer computer and a plurality of seller computers. Although certain examples provided herein describe the embodiments of the invention in the context of mortgages, persons skilled in the art will recognize that other assets may be utilized within the scope of the invention. One advantage, among others, of the present invention is that it reduces risk on the operational side of the trading, purchase or sale of asset-backed securities, and provides increased availability and liquidity in such products.

Generally speaking, as known to industry and market participants, a "specified pool" is a specific security in which the buyer knows in advance what assets comprise the specified pool. In the case of mortgage-related securities, these pools are typically guaranteed (also known as "stamping") by one of the three mortgage-related agencies or GSEs: (1) Fannie Mae, (2) Freddie Mac, and (3) Ginnie Mae. In the context of certain embodiments of the present invention (e.g., those where a set of characteristics for a yet to be created specified pool are defined by a buyer) the term "specified pools" is used more broadly to include asset-backed securities in which a buyer and seller come to an agreement on a specific grouping or pool of assets even though that pool may not yet have been, in the case of MBS, guaranteed and given a CUSIP by one of the GSEs. In accordance with embodiments of the present invention, it is intended that such specified pools created using the methods and systems disclosed herein will be submitted to the appropriate GSE or other agency or entity, as applicable, to be guaranteed as is known in the art.

In one embodiment, a method in accordance with such a system generally comprises: (i) providing information relating to a plurality of asset-backed security pools (e.g., pools of mortgages) to buyer using the buyer computer; (ii)

receiving from the buyer computer a selection of one or more asset-backed security pools; (iii) creating a specified pool list of asset-backed security pools based on the selection of one or more asset-backed security pools; (iv) causing the specified pool list to be displayed on at least one of the plurality of seller computers; (v) receiving pricing from the at least one of the plurality of seller computers for the specified pool list; and (vi) executing a transaction for the specified pool lists at the pricing received from the at least one of the plurality of seller computers for the specified pool list.

The method may further comprise retrieving information for each of the asset-backed security pools from a source, and causing the display of the information on the buyer computer. Moreover, such a method may include receiving a criteria for the asset-backed security pools from the buyer computer and wherein the retrieving step comprises retrieving information for each of the mortgage-backed security pools from the source based on the criteria.

In some embodiments, the method of creating the specified pool of asset-backed securities further comprises: generating a matrix of asset-backed security pools based on the selection of one or more asset-backed security pools, and calculating aggregate information related to the matrix of one or more asset-backed security pools. The aggregate information may include aggregated data related to at least one indicator for one or more of the selected asset-backed security pools, wherein, at least in some instances, such as in connection with mortgage-backed securities, the indicator is selected from the group consisting of a CUSIP or other identifier number, a pool number, a weighted average maturity, a weighted average coupon, a constant prepayment rate, an originator identifier, an average loan size, a maximum loan size, one or more geographic loan locations, and an average FICO score.

In accordance with various embodiments, such methods may further comprise causing the specified pool list to be displayed on at least one of the plurality of seller computers, such the display of a matrix of asset-backed security pools. In this way, one or more sellers can provide pricing for the specified pool list (e.g., in the form of a spread from the at least one seller). The buyer may then select pricing from one of the plurality of sellers for all of the asset-backed security polls in the specified pool list, or select pricing from at least two of the plurality of sellers for a portion of the asset-backed security polls in the specified pool list.

In an alternative embodiment, a method of creating the specified pool of asset-backed securities comprises: receiving an inquiry message from a buyer wherein the inquiry message includes one or more characteristics for a pool of assets; generating an inventory request message and causing the display of said inventory request message on a seller computer; and receiving an offer message from the seller computer including information related to an asset-backed security that corresponds to at least a portion of the characteristics for a pool of assets included in the inquiry message. As will be described in greater detail, the asset-backed security may be a security existing in the inventory of the seller or a new pool of assets created by the seller for the purpose of meeting the buyer's requested characteristics.

A system in accordance with the various embodiments of the present invention generally comprises a computer system designed and configured to store and deliver upon request information related to a plurality of asset-backed security pools. The computer system is capable of communication with one or more buyers and one or more sellers at any given time. The computer system is preferably programmed to provide information related to a plurality of asset-backed security pools, enable a buyer to select one or more pools for inclusion in a specified pool list, provide aggregate pool data related to the selected specified pool list, provide information related to the selected specified pool list to one or more sellers, receive pricing information from the one or more sellers, and execute a trade for one or more selected mortgage-backed securities in the specified pool list.

In addition, an embodiment of the invention comprises a computer program embodied on a computer readable medium for creating a specified pool of asset-backed securities, which includes (i) a pool section module comprising programming to cause a computer to: retrieve information relating to a plurality of asset-backed securities from a database in communication with the computer; transmit the information through a network to a buyer computer, and receive a selection signal from the buyer computer, the selection signal including an indication of at least one or more asset-backed security pools or individual asset-backed securities; (ii) an order creation module comprising programming to cause the computer to: create a specified pool list based on the selection signal received from the buyer computer; (iii) a trade negotiation module comprising programming to cause the computer to: transmit the specified pool list to at least one seller computer and receive a price signal representing a dollar amount for the asset-backed securities in the specified pool list identified from the seller computer; and (iv) an execution module comprising programming to cause the computer to: transmit the price signal to the buyer computer; receive an authorization signal from the buyer computer in response to the price signal, and execute a transaction based on the specified pool list and the price signal.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE FIGURES

Embodiments of the invention will be described and shown in detail by way of example with reference to the accompanying drawings in which:

FIG. 8 is a graphical user interface of a second type of "bid list" ticket in accordance with the present invention;

FIG. 12 is a graphical user interface for specifying the attributes of an asset-backed security in accordance with the present invention.

DETAILED DESCRIPTION OF THE PREFERRED EMBODIMENTS

In accordance with various embodiments of the invention, and as shown in the FIGS., various systems and methods are disclosed which generally provide a platform for the creation, communication, price quotation, and execution of trades for specified pools of asset-backed securities.

Figure 1:
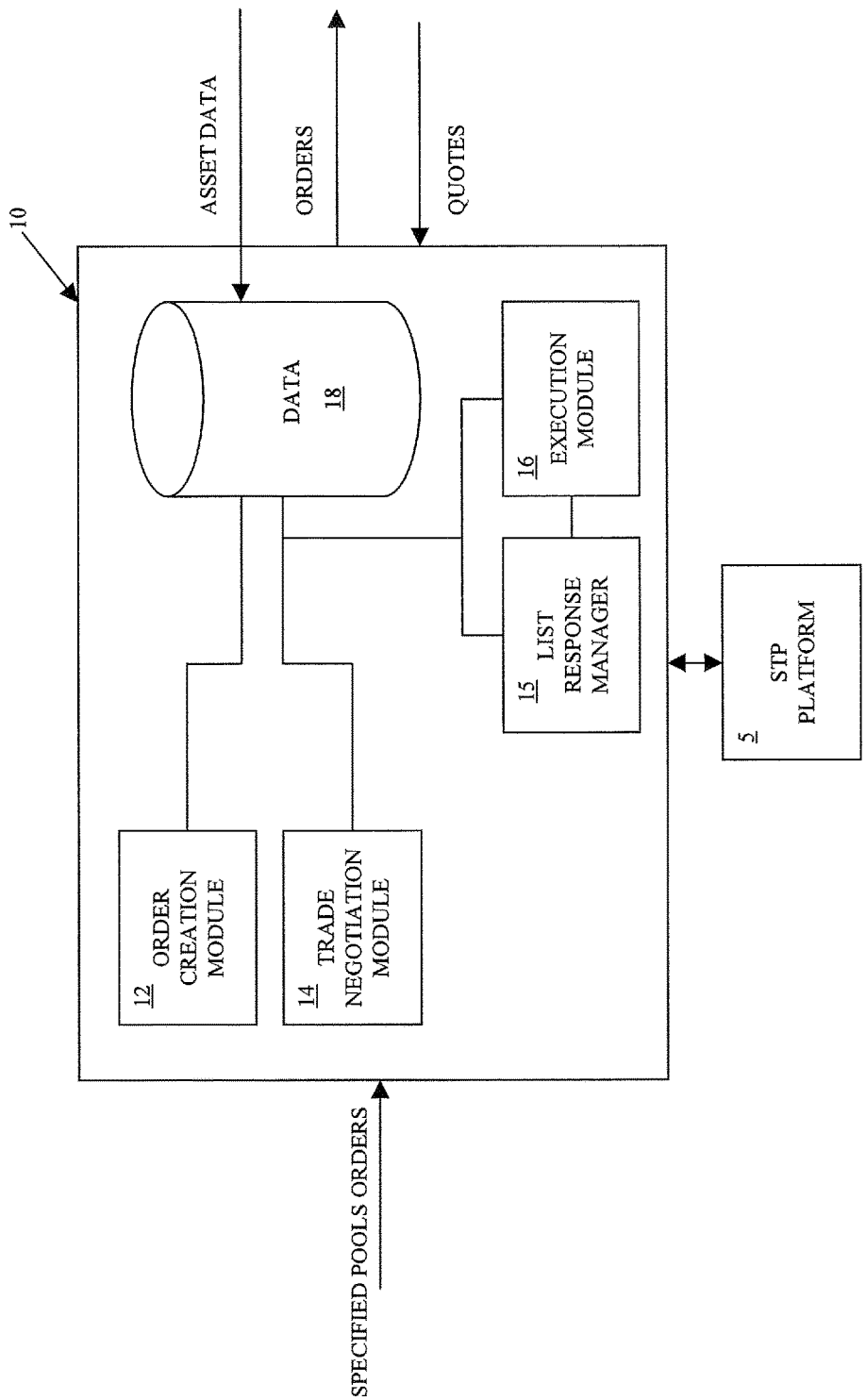
FIG. 1 is a schematic diagram of an embodiment of a system in accordance with the present invention.

With reference to FIG. 1, there is shown a preferred embodiment of a system 10, which generally comprises one or more computer systems and databases and related database management systems. One skilled in the art will recognize that the computer systems may as a matter of design choice include any number and configurations of computers and databases, which may be used separately or in tandem to support the traffic and processing needs necessary in operation at one time. If multiple computers are used, the computer may be configured using a round-robin configuration to handle end user traffic.

Although not depicted in the figures, the one or more computers of computer system 10 generally include such art recognized components as are ordinarily found in such computer systems, including but not limited to processors, RAM, ROM, hard disks or other computer readable mediums, clocks, hardware drivers, associated storage, and the like. References herein to the term "database" or "database system" generally refer to one or more storage devices or computers with storage media storing a collection of records or data, as well as software for managing such records or data (commonly known as a database management system (or DBMS)). The database may take the form of a relational, hierarchical, network, or other known structure as may be deemed to be most efficient. In a preferred embodiment, the present invention employs a relational database to store the various associations of data described herein.

Furthermore, each of the computer systems described herein preferably includes a network connection (not shown). The network connection may be a gateway interface to the Internet or any other communications network through which the systems can communicate with other systems and user devices. The network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future.

Figure 2:
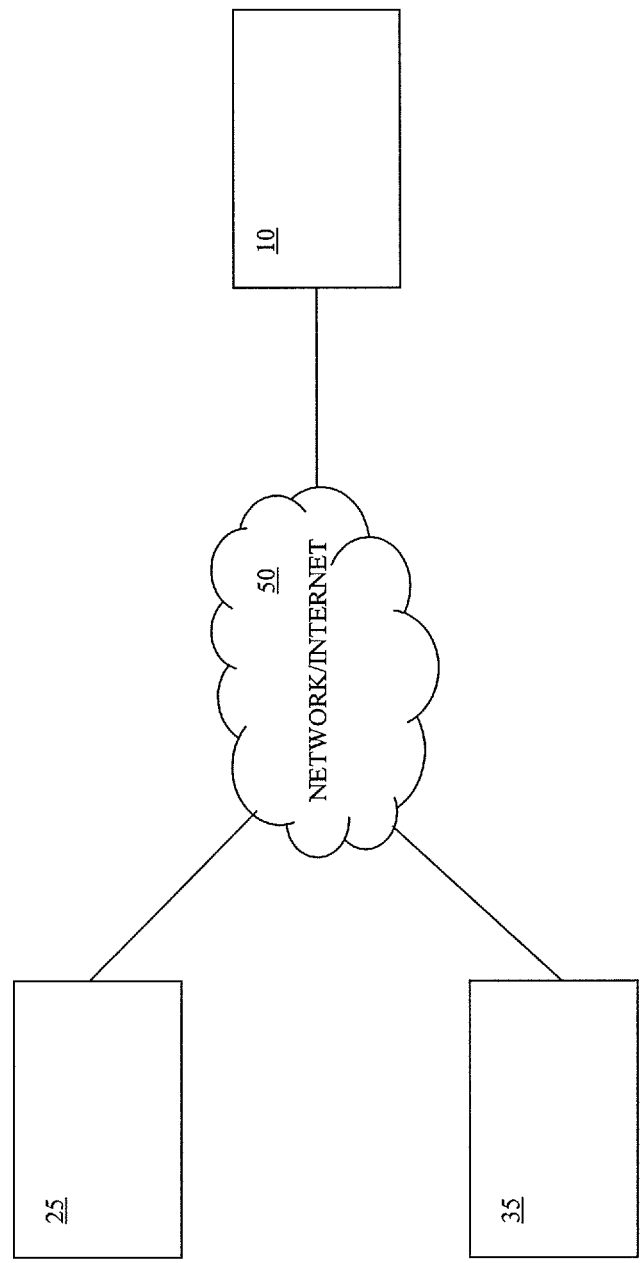
FIG. 2 is an alternate view of a system in accordance with the present invention.

With reference to FIG. 2, there is shown another view of a system architecture in accordance with a preferred embodiment of the present invention in which system 10 is interconnected via network 50 to one or more buyer and seller computer systems 25, 35. Moreover, as illustrated in FIG. 2, the system 10 preferably utilizes a distributed software application arrangement to provide the processing of transactions involving asset-backed securities. Although the embodiments described herein are described in terms of a distributed, networked software solution operative in a client-server environment, a wholly server-based or client-based approach could be adopted, so long as the system was configured to provide the functionality disclosed herein. As noted above, network 50 may be a gateway interface to the Internet or any other communications network through which the systems can communicate with other systems and user devices. The connection may also be a direct connection for security purposes.

Buyer and seller computers 25, 35 can be any type of personal or network computer such as an IBM-compatible computer running an Intel chipset and having an operating system, such as Microsoft Windows NT, 2000, XP, Vista and the like, and, preferably, running a browser program such as Microsoft Internet Explorer, Netscape Navigator, or Mozilla Firefox. Apple-based computer systems can also be used within the context of the system being disclosed. It is also within the scope of the present invention that computers 25, 35 may be handheld or table computing devices, such as a personal digital assistant (PDA), pocket PC, and tablet PC, iPhone device, or the like. Computers 25, 35 preferably have access to a communications network via a modem or broadband connection to permit data communication between the participants and the system 10.

Various input and output devices are preferably provided with the buyer and seller computers 25, 35 including, by way of non-limiting example, a display (e.g., cathode ray tube (CRT), liquid crystal display (LCD), etc.), and an input device (e.g., a keyboard, mouse, touch pad, or light pen). The buyer and seller computers 25, 35 would also preferably include a storage device such as, for example, a magnetic disk drive and magnetic disk, a CD-ROM drive and CD-ROM, DVD, or other equivalent device. The specific hardware combination/configuration may vary as a matter of design choice within the functional parameters disclosed herein. Buyer and seller users of the system 10 typically interact with the GUI's displayed by the software modules by "clicking" on numbers or graphics (e.g., buttons) that are displayed on the GUI's. Persons of skill will understand that the present invention is not limited to clicking with a computer mouse, but includes use of any other device for indicating an action with graphics-based software, such as a touch pad, light pen, touch sensitive display screen and the like.

With reference back to FIG. 1, system 10 is also preferably interconnected with a straight-through-processing system 5, as is disclosed by U.S. Pat. No. 7,433,842 issued on Oct. 7, 2008, and entitled "Method and System for Effecting Straight-Through-Processing of Trades of Various Financial Instruments," the entire disclosure of which is incorporated herein by reference.

System 10 generally includes an order creation module 12, a trade negotiation module 14, a list response manager 15, and an execution module 16, as well as a database 18 for storing data related to asset-backed securities, market data, buyer account information, and related data. The order creation module 12, trade negotiation module 14, list response manager 15, and execution module 16 generally comprise computer programming operative on one or more computers to perform the functions described herein.

In general, order creation module 12 has two modes of functionality. In a first mode, order creation module 12 permits a buyer to search a database of specified pools and to select one or more pools from the inventory for pricing by a selected group of sellers. It will be understood from the following disclosure that, although multiple pools are selected, and number of pools less than the total number selected (or none at all) may be quoted and ultimately traded. In a second mode, a buyer is provided with the option to select thee characteristics of a desired specified pool. These characteristics may be transmitted through system 10 to one or more sellers. The sellers can identify one or more pools in their respective inventories that substantially meet the buyers specified set of characteristics or agree to create a specified pool meeting such characteristics.

Figure 3:
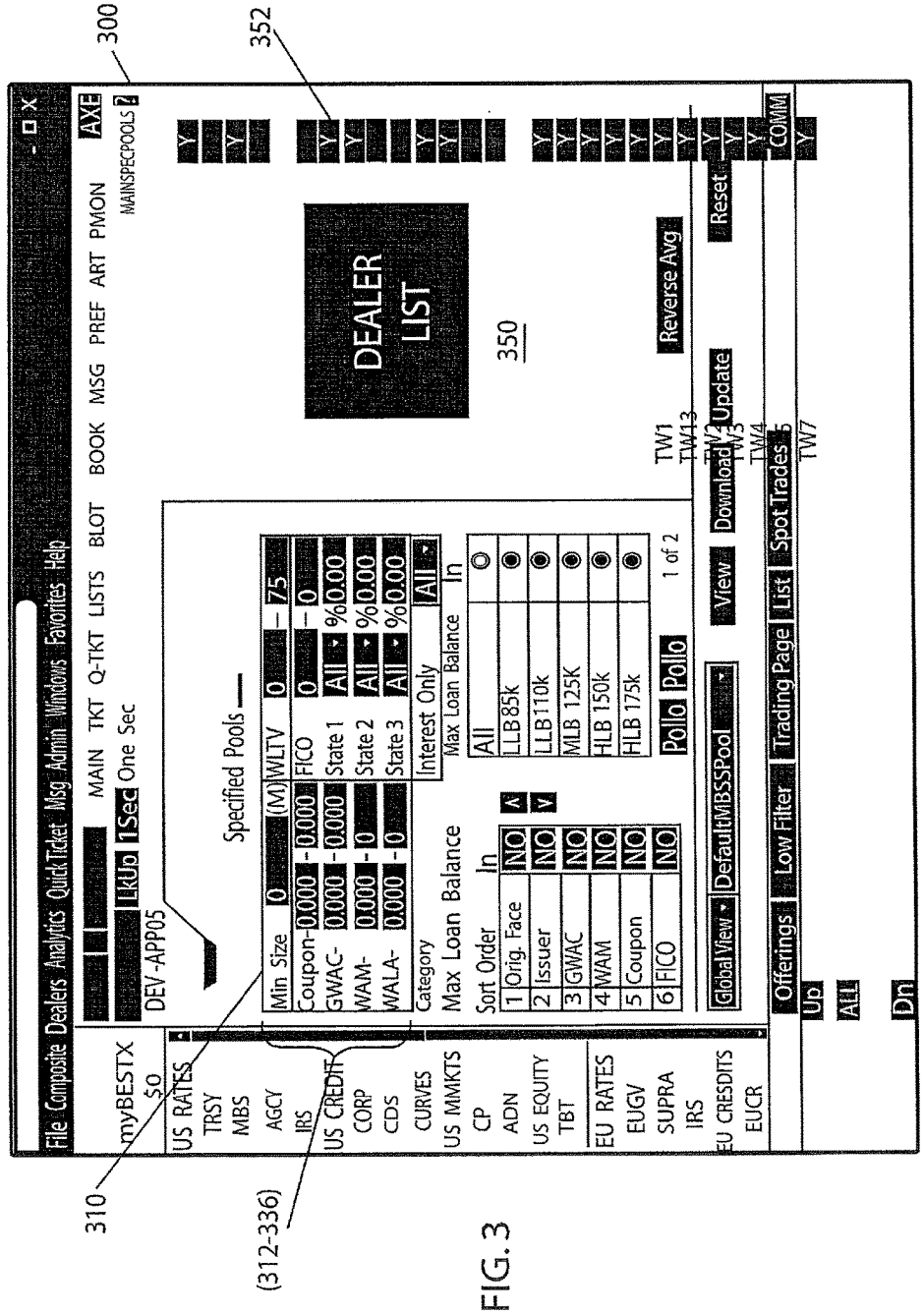
FIG. 3 is an inventory filter graphical user interface for creating a security query in accordance with the present invention.

With reference of a first mode of order creation module 12, system 10 can provide functionality to buyers to review the details of various asset-backed securities which are stored in database 18. Such details typically include, for instance in connection with a mortgage-backed security, a CUSIP number (or other identifier), a pool number, a weighted average maturity, a weighted average coupon, a constant prepayment rate, an originator identifier, an average loan size, a maximum loan size, one or more geographic loan locations, and an average FICO score. By way of example, as shown in FIG. 3, an inventory filter GUI 300 provides a number of filter options to enable the buyers to search for mortgage-backed securities meeting defined criteria. In the example shown, GUI 300 includes a criteria zone 310 and a dealer list zone 350. The criteria zone 310 is used to define the criteria according to which the desired securities will be pulled from database 18. The dealer list zone 350 includes a list of sellers and corresponding graphical toggle buttons 352 to enable the buyer to select the sellers (e.g., dealers) for which the buyer desires to view appropriate securities. In other words, by defining the criteria in criteria zone 310 and selecting dealers in dealer list zone 350, the buyer can return specific securities meeting the defined criteria and being offered by the selected dealers.

The criteria, as shown in FIG. 300, preferably includes a minimum size field 312, a weighted average loan to value 314, a coupon size field 316, a weighted average coupon field 318, a weighted average maturity field 320, a weighted average loan age 322, FICO score 324, state limiters 326, 328, 330, and an interest only drop down menu 332. In a preferred embodiment, GUI 300 also includes a maximum loan balance field 334, which includes a plurality of max loan balance levels selectable through use of radio buttons.

As a further feature, in a preferred embodiment, GUI 300 also includes a sort order field 336, which enables the buyer to customize the sort order of the results by various criteria, including but not limited to face value, issuer, weighted average coupon, weighted average maturity, coupon, and FICO score.

In operation, by setting various criteria and through selection of one or more sellers, through the operation of order creation module 12, buyers can create a customized inventory query which will return available asset-backed securities from database 18. In the alternative, as described further below, the query can be submitted directly to the seller in order to determine whether the seller has or can stipulate to an asset-backed security meeting the buyer's requirements. This feature may be used when a security meeting the buyer's requirements is not in the inventory of one or more sellers.

Figure 4:
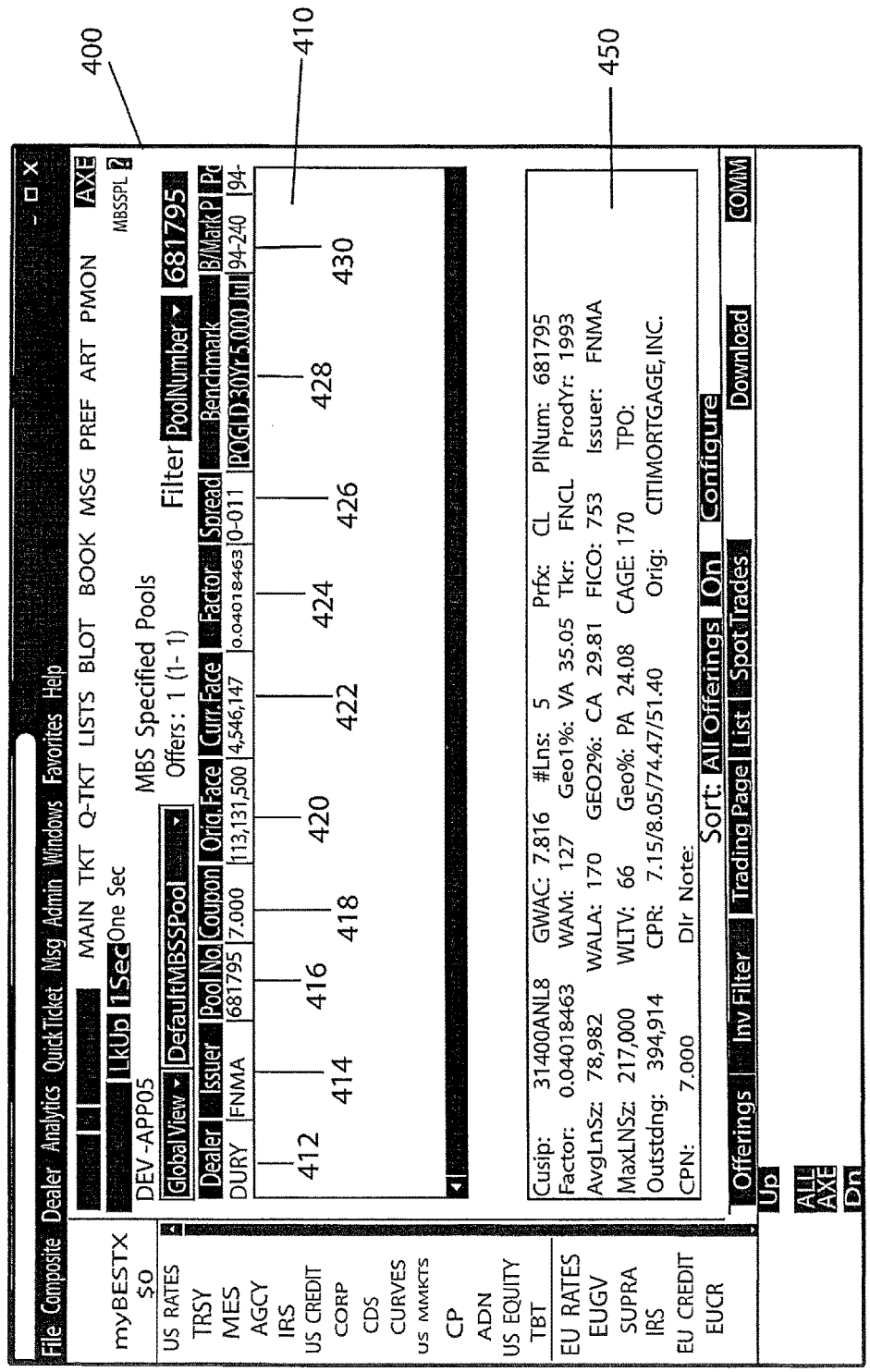
FIG. 4 is a graphical user interface for reviewing the results of an inventory query in accordance with the present invention.

With reference now to FIG. 4, there is shown a preferred embodiment of graphical interface 400 (generated by order creation module 12) for viewing the result of an inventory query submitted through GUI 300. Inventory offering GUI 400 comprises an inventory list section 410 and a security data section 450. The inventory list section 410 preferably includes a number of fields related to the display of asset-backed securities; namely, a seller identifier 412, issuer identifier 414, pool number 416, coupon rate 418, original face value 420, current face value 422, factor 424, spread 426, benchmark 428, benchmark price 430 and other information know in the art to be pertinent to the trading of the particular asset-backed security at issue.

Security data section 450 preferably also displays a variety of data relevant to the trading of the security. In the case of mortgage-backed securities, security data section 450 can include the following data, among other pertinent information: a CUSIP number (or other identifier), a pool number, a weighted average maturity, a weighted average coupon, a constant prepayment rate, an originator identifier, an average loan size, a maximum loan size, one or more geographic loan locations, and an average FICO score. Table I below sets forth a preferred embodiment of the list creation columns and various options:

TABLE I

| Column Name | Description | Hide if OUTRIGHGT | Control | Default Value | Global Setting |
|---|---|---|---|---|---|
| Select Box | Check Box | | Check Box | Selected | Yes |
| # Dealers | The number of dealers currently selected for the line item | | Output only | Not selectable | No |
| Buy/Sell | Clicking B/S button flips field. For AON Swap list, the benchmark & pool directions must be inversed | | Toggle Button | Not selected unless user cut and pastes the value from or EXCEL | Yes |
| Original Pool Qty (000) | Minimum value = 1k Existing limits on outright tickets should be respected. | | Input | None | Yes - applies same quantity to entire column |
| CUSIP/ Identifier | User can enter pool description or CUSIP. System will "look up" security from user entry Multiple matches will display in the benchmark field. | | Input | None | No |

TABLE I-continued

| Column Name | Description | Hide if OUTRIGHGT | Control | Default Value | Global Setting |
|---|---|---|---|---|---|
| | Summary line will display total number of pools | | | | |
| Pool Desc. | If a partial match is found during a paste or manual entry, this field will display Choose Security | | Output | TWEB Standard description | No |
| Current Face | Summary line displays the total current face of all pools | | Output | Pool current face from security database | No |
| Benchmark | If AON is set, the user can enter a single benchmark in the GLOBAL field to set for the entire list. If individual, the user can change any issue | | Drop Down | Use the benchmark associated with the first pool in the list | Yes— |
| Benchmark Qty | | YES | Input | Same as Orig pool Qty | |
| Type | Defaults from user preference Only appears on the summary line for AON lists. Displays on each line for individual lists | | Toggle Button | User preference | Yes |
| Pool Settle | Global setting applies to pools only | | Dropdown | Same as benchmark | Yes |
| TBA Settle | | Yes | Output Toggle Button | TBA settle | No |
| Brkdn | Opens the account breakdown page | | | | No |
| Note | Max characters is This column should be added to all products and associated dealer software list tickets. | | Input | | |

Figure 5:
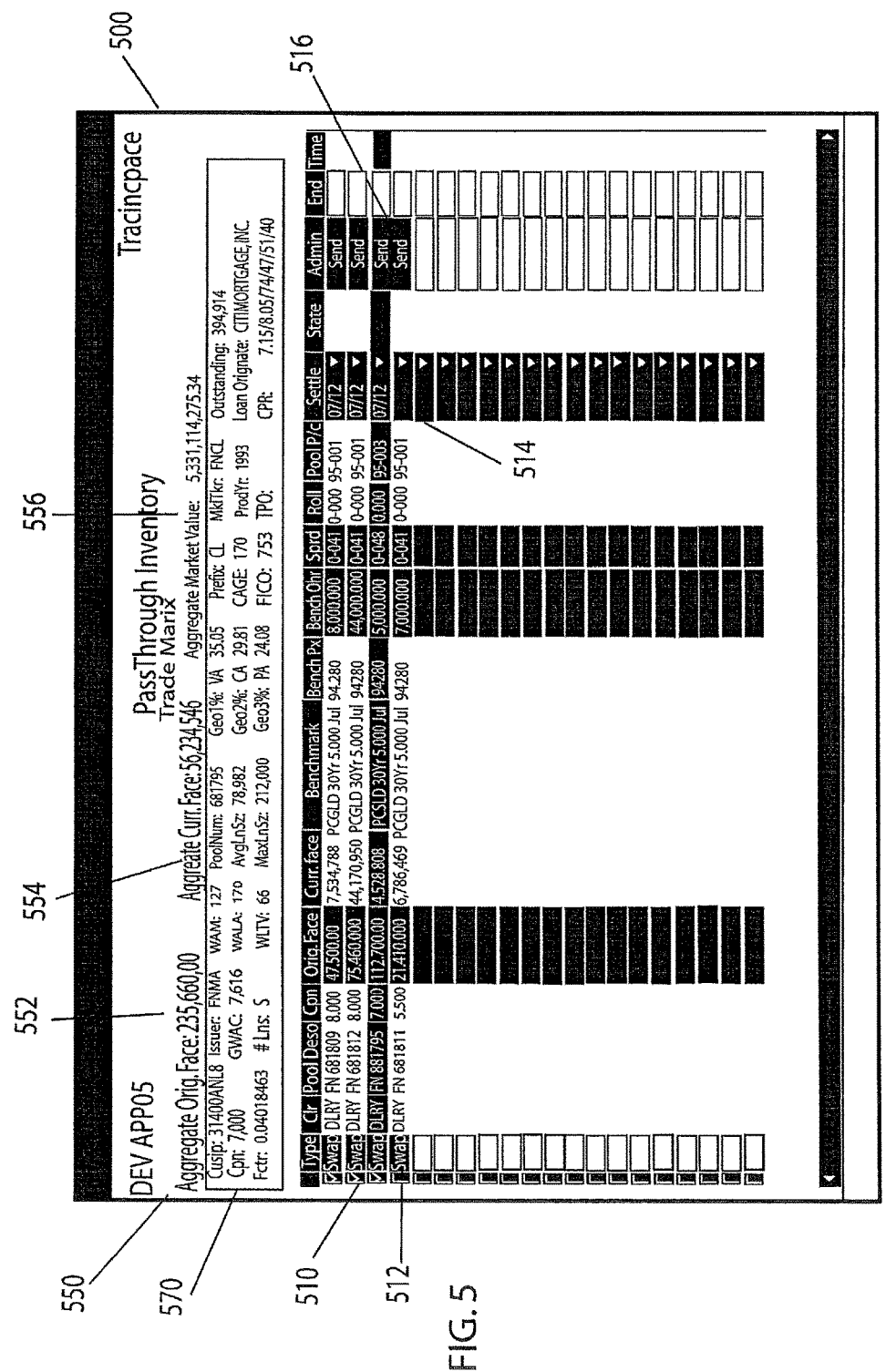
FIG. 5 is a graphical user interface of a trade matrix in accordance with the present invention.

In one embodiment, on inventory offering GUI 400, a buyer can select one of the specified pools or a plurality of pools to be included in a specified pool list. In a preferred embodiment, order creation module 12 can be programmed to display the selected securities on a trade matrix GUI 500, as shown in FIG. 5. The trade matrix GUI 500 preferably includes a security list section 510, which preferably contains similar information and layout to the inventory list section 410 of inventory offering GUI 400. The security list section 510 can include one or more additional features for defining the type of transaction (e.g., buy, sell, or swap), as depicted by graphical button 512, or for defining the settlement date, as depicted by field 514, or for performing an action, as depicted by action button 516.

GUI 500 can also include an aggregate pool data section 550 in addition to a static security data section 570. Aggregate pool data section 550 preferably displays aggregate data for the asset-backed securities in the security list section 510, in order to provide the buyer an indication of the nature of the pool being created by including one or more of the securities listed in the security list section 510. In this way, order creation module 12, in a preferred embodiment, can be programmed to generate aggregated pool data for the selected pools, so that the buyer can efficiently and effectively customize the desired order. In a preferred embodiment, aggregate pool data section 550 includes an aggregate original face value field 552, an aggregate current face value field 554, and an aggregate market value field 556.

In an alternative embodiment, wherein one or more desired securities are not in inventory order creation module 14 can be programmed to permit, a buyer to send an inquiry message to one or more sellers inquiring as to the availability of a security meeting the buyer's needs. In this embodiment, a buyer typically creates an order query using system 10's order creation module 12 to determine whether the desired security is listed in database 18. As previously described in connection with FIG. 3, such query details typically include, for instance in connection with a mortgage-backed security, a CUSIP number (or other identifier), a pool number, a weighted average maturity, a weighted average coupon, a constant prepayment rate, an originator identifier, an average loan size, a maximum loan size, one or more geographic loan locations, and an average FICO score. While the buyer will generally first use inventory filter GUI 300, as shown in FIG. 3, to enable the buyer to search for mortgage-backed securities meeting defined criteria, in some instances, the desired security may not be available. In those instances, the buyer can use criteria zone 310 to define the criteria according to which an inquiry message will be generated and transmitted to one or more sellers. The dealer list zone 350 includes a list of dealers, acting as sellers, and corresponding graphical toggle buttons 352 to enable the buyer to select the dealers to which the inquiry message will be transmitted.

Once the buyer completes the process of inputting desired criteria and selecting dealers, the criteria and dealer data is transmitted to and received by system 10. System 10 then generates an inquiry message which includes the characteristics for the pool of assets defined by the buyer. The data in the inquiry message is then transmitted to the selected dealer computer 35. FIG. 12 depicts a preferred embodiment of an inventory request message that includes data in the inquiry message and which is caused to be displayed on the dealer computer 35. As shown in FIG. 12, on the top portion of GUI 1200, several desired characteristics of a desired security are displayed. In the example shown in FIG. 12, such characteristics for a mortgage-backed security include, but are not limited to, size 1202, max loan balance 1204, issuer 1206, program 1208, coupon range 1210, weighted average coupon 1212, weighted average maturity 1214, weighted average loan age 1216, FICO score 1218, weighted loan to value 1220, and geographic percentages 1222.

Using the inventory request GUI 1200, the dealer can review the criteria desired by the buyer and either offer a pool from the dealer's inventory or stipulate to a new pool by defining some or all of the pool's characteristics. An inventory pool can be selected using the "pool #" drop-down menu 1230, which includes a plurality of available pool securities in the dealer's internal inventory. Alternatively, the dealer can use the mine functionality (see graphical button 1275) to search for additional available pool securities. In another alternative, the dealer can define certain characteristics of a stipulated, to be created pool, using the fields located on the lower half of GUI 1200. Specifically, in a preferred embodiment for a mortgage-backed security, such fields include, but are not limited to, a CUSIP/Identifier field 1232, coupon rate 1234, weighted average maturity 1236, weighted average coupon 1238, weighted average loan age 1240, size 1242, spread 1244, maximum loan balance 1246, benchmark 1248, and factor 1250.

The data defined by the dealer is then transmitted to system 10 and on to the buyer computer 25. The securities defined by the dealer can then preferably be reviewed side-by-side with the securities initially found in the inventory listing of database 18.

Once the buyer is satisfied with the list of asset-backed security pools (e.g., MBS pools), the specified pool list can be transmitted through system 10 to the list of selected sellers. In a preferred embodiment, this action causes the calling of trade negotiation module 14, which operates in conjunction with list response manager 15 and execution module 16 to spot (or price) the specified pool list, otherwise negotiate the trade details, and ultimately execute a trade for the requested specified pool list. In operation, the trade negotiation module 14 will call the list response manager 15 to enable the seller, using the seller computer 35, to provide quotes in response to the receipt of a specified pool list. Preferably, the trade negotiation module 14 then transmits the quoted list information back to the buyer for review and acceptance. If there are multiple competing sellers, the buyer will need to choose between the buyers. Once there is acceptance, trade negotiations module 14 will call execution module 16 which will execute a trade and provide any "last look" options, as described in greater detail below, that may be optionally programmed into execution module 16.

Figure 6:
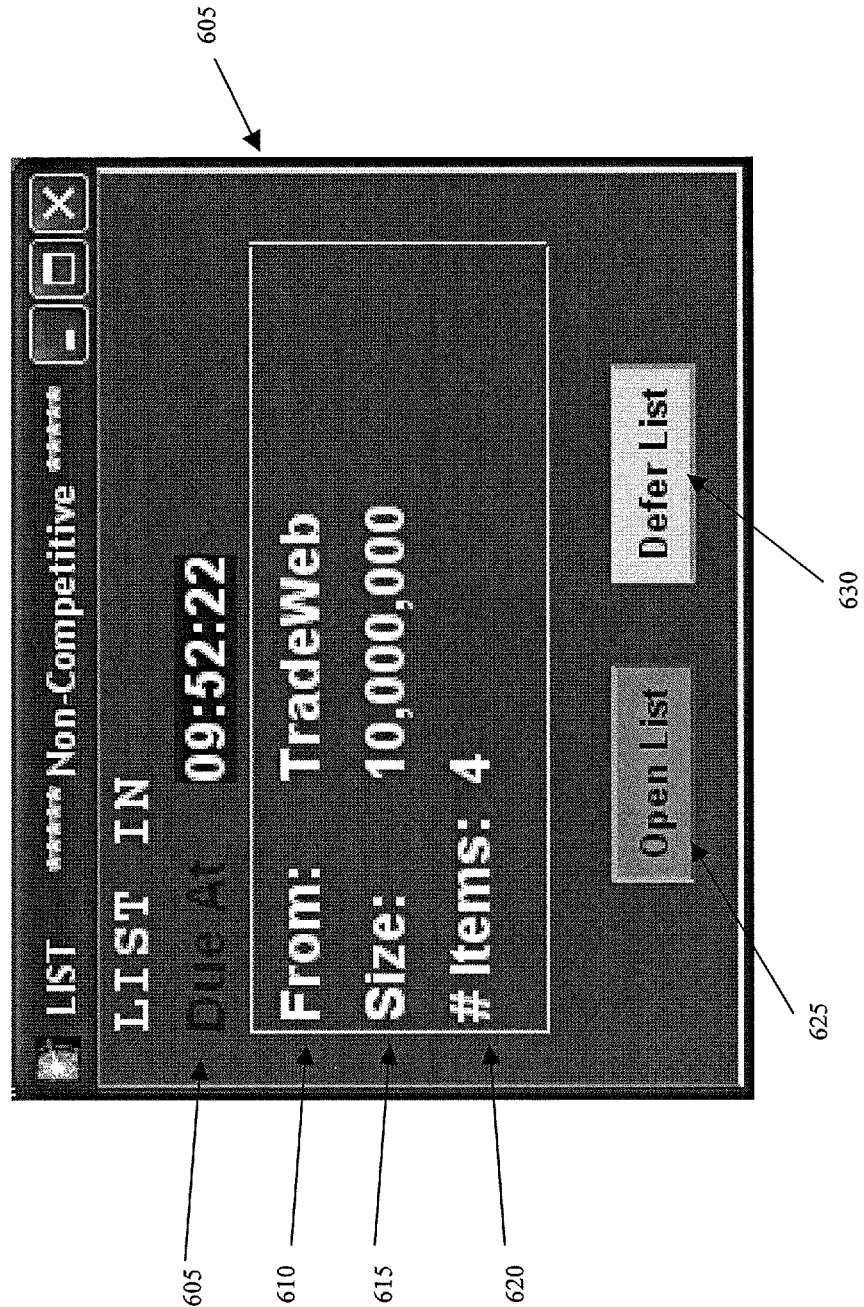
FIG. 6 is a graphical user interface of a "list in" ticket in accordance with the present invention.

On the seller computer 35, in a preferred embodiment, a list-in ticket 600, as shown in FIG. 6, can be caused by system 10 to be displayed on the seller computer 35. List-in ticket 600 can include a "due at" time 605, a buyer identifier 610, an aggregate size indicator 615, and a number of items indicator 620 (e.g., to identify the number of specified pools in the list). List-in ticket 600 can also include an "open list" selection item 625 and a "defer list" selection item 630. As shown in FIG. 6, selection items 625, 630 are preferably graphical buttons.

Figure 7:
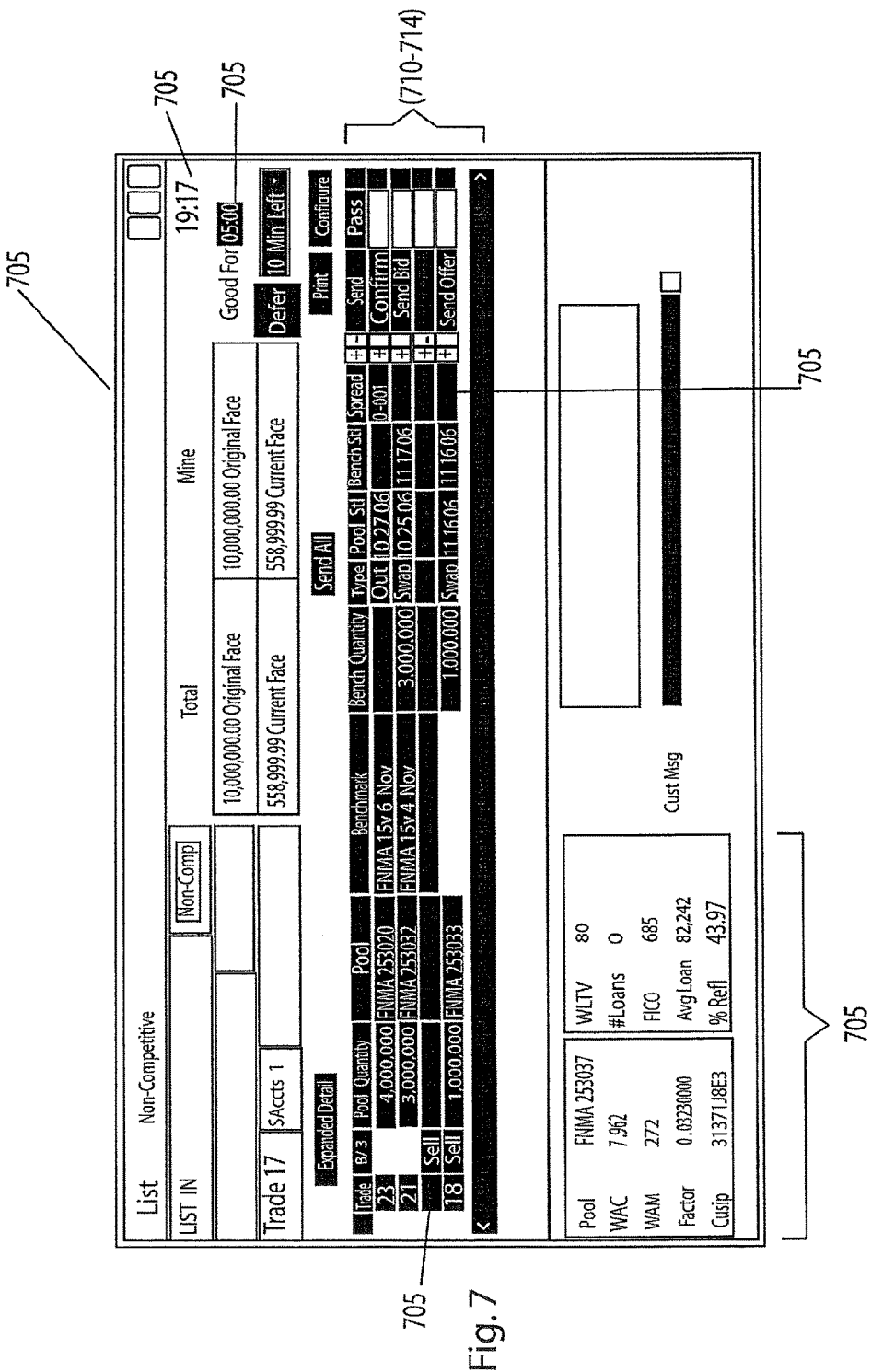
FIG. 7 is a graphical user interface of a first type of "bid list" ticket in accordance with the present invention.

If the "open list" selection item 625 is "clicked" by a seller, a bid list ticket 700, as shown in FIG. 7 can be displayed. From the seller perspective, a list response manager module 15 (depicted on FIG. 1) preferably provides traders with the ability to "construct" their bid list responses. As shown in FIG. 7, a bid list ticket 700 preferably includes a pool list section 705, which includes relevant data (e.g., pool quantity, pool identifier, benchmark, benchmark quantity, type, spread, etc.) concerning the pools selected at the buyer computer 25 to be included in the specified pool. Additionally, several graphical selection items 710, 712, and 714 can be included to permit the seller to customize the transaction. For example, using "+/−" buttons 710, the seller can enter spread in the spread field 707. The "+/−" button 710 preferably increments spread in ⅛ of a 32nd. The send buttons 712, cause the spread to be transmitted through system 10 to the buyer computer 25. Clicking on the pass buttons 714 will send a pass to the buyer. It is preferred, however, that the seller can "UnPass" a trade and resubmit a spread to the buyer. With reference to the top right hand corner of GUI 700, a "due in" time indicator 720 and a "good for" time indicator 722 are preferably displayed to the seller to facilitate timely creation of the trade. As shown in FIG. 7, a portion 730 of the bid list ticket can be a context sensitive area that preferably shows some fundamental data about the security.

Figure 8:
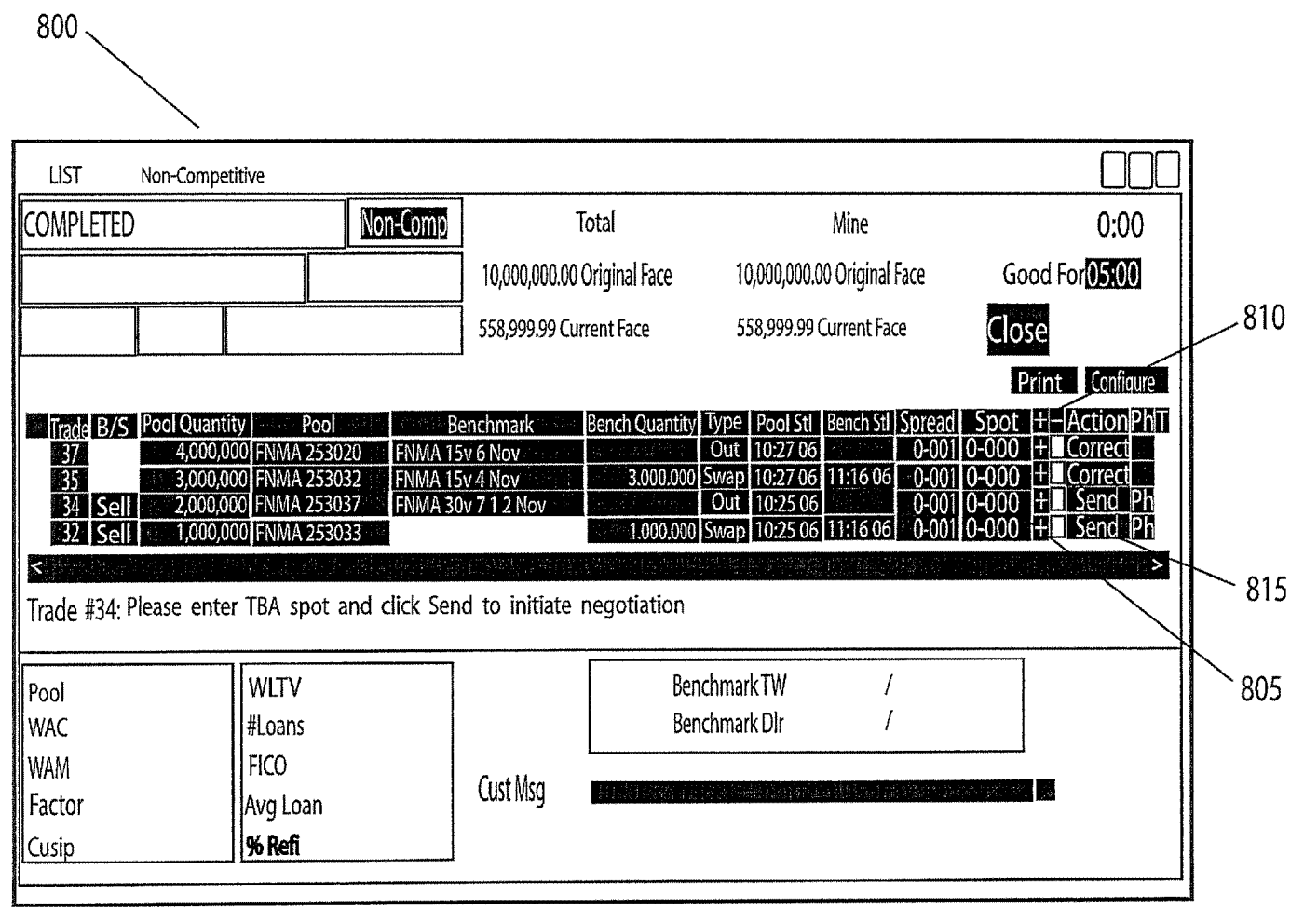

With reference now to FIG. 8, the seller can use the bid list ticket 800 to input the individual spot trade for each specified pool (unless the trade has been designated as an AON trade). In a preferred embodiment, bid list ticket 800 includes a spot field 805 that preferably defaults to the TBA composite price generated by system 10's pricing engine. The seller can increase or decrease the spot pricing by using "+/−" buttons 810. The "send" button 815 transmits the spot price to the buyer for negotiation.

Figure 9:
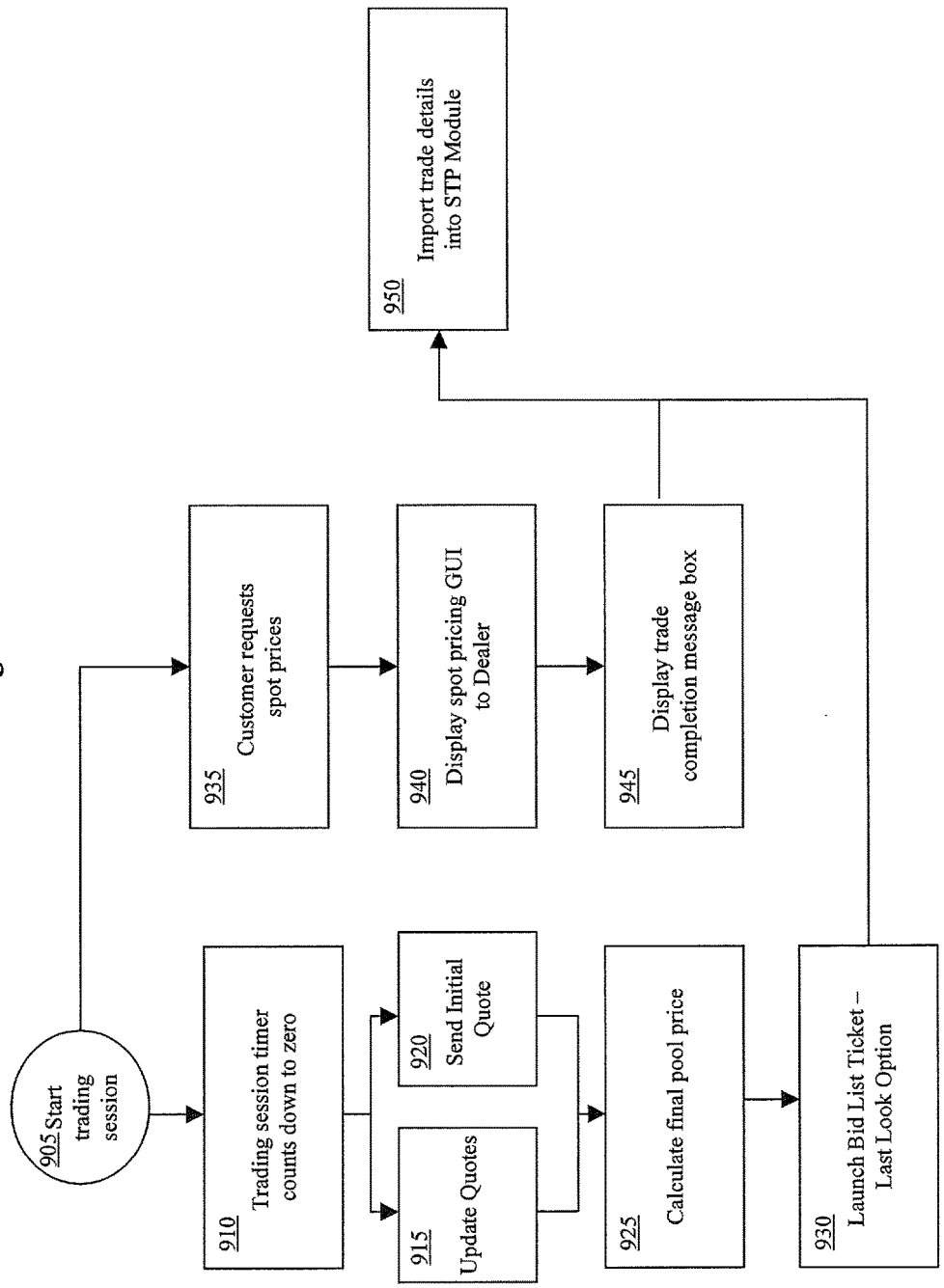
FIG. 9 is a flow diagram showing an embodiment of a quoting protocol in accordance with the present invention.

A preferred embodiment of a quoting protocol will now be described with reference to FIG. 9. In one embodiment, the quoting protocol is all or none (i.e., AON). In other words, the seller submits a spread for the entire specified pool list, such that the spread is applied to each individual pool in the list, and the final pool price is computed after the TBA is spotted. Alternatively, a buyer can request spot prices for multiple trades. In a preferred embodiment, the trades must be from the same specified list, of the same direction (e.g., buy or sell), and share the same benchmark. Referring back to FIG. 9, the 'Due In' time is preferably set at the discretion of the buyer. Once the specified 'Due In' time is equal to zero, in step 905, the buyer defined "Trading Session" will begin ticking to zero, in step 910. As this point, selling traders can (i) update quotes any time prior to expiration of "Trading Session" (step 915); or (ii) send an initial quote any time prior to the end of the "Trading Session" (step 920).

During the execution phase, as operative by the execution module 16, it is preferred that when a buyer executes, the seller will have a "last look" option in order to accept, pass, or counter the trade, in step 925. Seller can preferably manage the "last look" actions via the bid list ticket. Thus, if an individual trade is being executed, the relevant trade for which the buyer is attempting to execute will be highlighted and active and all other trades will be disabled.

Figure 10:
FIG. 10 is a graphical user interface for setting spot prices in accordance with the present invention.
Figure 11:
FIG. 11 is a trade completion message box in accordance with the present invention.

If the buyer requests spot prices, in step 930, the system 10 can cause the display of a GUI 1000, as shown in FIG. 10, with the selected pools to be spotted 1010, relevant information for the list 1020, and "+/−" buttons 1030 for setting the spot price. As each individual pool is spotted, in step 935, another GUI 1100, as shown in FIG. 11, can be caused to be displayed to either or both of the buy-side or sell-side users indicating that the trade is completed. GUI 1100 preferably includes several details of the trade, including without limitation a description 1105, face value 1110, current face value 1115, spread 1120, spot 1125, price 1130, and the settlement date 1135. At this point in the process, in step 940, the trade(s) can be imported into the system 10's straight-through-processing module.

In a preferred embodiment, as a further feature, the list response manager 15 is programmatically configured to provide various aggregation features that generally permit certain like pool trades to be aggregated for spotting purposes. Typically, if a specified pool list has not been designated all-or-none, then each individual pool in the list must be spotted to a benchmark, i.e., the seller will provide a spread for each pool. However, this process is highly inefficient. In the preferred embodiment being described, these inefficiencies are technically solved through the addition of a logical aggregation component to the list response manager 15 wherein, for example, similar pools in a list (e.g., Fannie Mae 5½ mortgage backed securities) are aggregated and spotted as a group. In this way, a single spread can be applied by a seller to an entire group of like securities. Alternatively, the aggregation component of the list response manager 15 preferably may be configured to provide aggregation across multiple trade requests that include like securities and which are submitted to the same seller. For instance, a buyer may create two specified pool lists wherein each list includes Fannie Mae 5½ MBSs and wherein the lists are both received by the same dealer. Here, a single spread quote can be efficiently applied to all of the Fannie Mae 5½ MBSs even though the securities are in separate lists. In the AON context, in a preferred embodiment, a seller must take all or none and, therefore, the quoting protocol is preferably performed as a single pay-up for the entire list, as opposed to providing spread quotes for individual or aggregated securities.

While there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

We claim:

1. A computer-implemented method for creating specified lists of mortgage-backed security pools using a computer system capable of communication with a buyer computer and a plurality of seller computers, the method comprising:
   providing to the buyer computer information from the computer system relating to a plurality of mortgage-backed security pools;
   obtaining securitization of the mortgage-backed security pools from a government sponsored enterprise;
   receiving from the buyer computer a first signal indicating a selection of one or more of the mortgage-backed security pools;
   creating on a processor a specified list of mortgage-backed security pools based on the selection of the one or more mortgage-backed security pools received from the buyer computer wherein each of the mortgage-backed security pools that are part of the specified list is associated with a unique CUSIP number and contains a pool factor that is reflective of the principal left to be distributed in each of the mortgage-backed security pools,
   wherein the creating further comprises:
   generating a matrix of one or more mortgage-backed security pools based on the selection of the one or more mortgage backed security pools; and aggregating information related to the matrix;
   transmitting the specified list to at least one of the plurality of seller computers;
   displaying the specified list on at least one of the plurality of seller computers;
   receiving a second signal indicative of pricing for at least one of the one or more mortgage-backed security pools in the specified list from at least one of the plurality of seller computers; and
   executing on a processor a transaction for at least one of the one or more mortgage-backed security pools in the specified lists for which pricing was received from the at least one of the plurality of seller computers.

2. The method of claim 1, wherein the step of providing information relating to a plurality of mortgage-backed security pools to an investor using the buyer computer comprises: retrieving information for each of the mortgage-backed security pools from a source; and transmitting the information displayed on the buyer computer.

3. The method of claim 2, wherein the source is a database.

4. The method of claim 2, wherein the source is an external information provider.

5. The method of claim 2, further comprising
   receiving a third signal indicating a criteria for the mortgage-backed security pools from the buyer computer;
   transmitting an inquiry message to a selected seller computer from the plurality of seller computers, the inquiry message including the criteria;
   receiving from the selected seller computer, information relating to one or more mortgage-backed security pools based upon at least a portion of the criteria; and
   transmitting the received information to the buyer computer.

6. The method of claim 1, wherein the information includes a pool number.

7. The method of claim 1, wherein the information includes a weighted average maturity.

8. The method of claim 1, wherein the information includes a weighted average coupon.

9. The method of claim 1, wherein the information includes a constant prepayment rate.

10. The method of claim 1, wherein the information includes an originator identifier.

11. The method of claim 1, wherein the information includes an average loan size.

12. The method of claim 1, wherein the information includes a maximum loan size.

13. The method of claim 1, wherein the information includes one or more geographic loan locations.

14. The method of claim 1, wherein the information includes an average FICO score.

15. The method of claim 1, wherein the aggregate information includes an aggregate original face value.

16. The method of claim 1, wherein the aggregate information includes an aggregate call value.

17. The method of claim 1, wherein the aggregate information includes an aggregate market value.

18. The method of claim 1, wherein the aggregate information includes aggregated data related to at least one indicator for the one or more mortgage-based security pools.

19. The method of claim 18, wherein the at least one indicator is selected from the group consisting of a CUSIP number, a pool number, a pool factor, a weighted average maturity, a weighted average coupon, a constant prepayment rate, an originator identifier, an average loan size, a maximum loan size, one or more geographic loan locations, and an average FICO score.

20. The method of claim 1, wherein the step of transmitting the specified list to be displayed on at least one of the plurality of seller computers comprises displaying the matrix of mortgage-backed security pools on one or more seller computers.

21. The method of claim 1, wherein pricing for the specified list is received in the form of a spread from the at least one seller.

22. The method of claim 21, wherein a plurality of sellers submit pricing for the specified list.

23. The method of claim 22, wherein the investor selects pricing from one of the plurality of sellers for all of the mortgage-backed security pools in the specified list.

24. The method of claim 22, wherein the investor selects pricing from at least two of the plurality of sellers for a portion of the mortgage-backed security pools in the specified list.

* * * * *